United States Patent [19]
Martin

[11] 3,717,760
[45] Feb. 20, 1973

[54] RADIATION FILL GAUGE
[75] Inventor: Philip T. Martin, Columbus, Ohio
[73] Assignee: Industrial Nucleonics Corporation
[22] Filed: Aug. 16, 1965
[21] Appl. No.: 479,974

[52] U.S. Cl. .......................250/43.5 FL, 250/43.5 D
[51] Int. Cl. .............................................G01n 23/10
[58] Field of Search ...................250/43.5 D, 43.5 FL

[56] References Cited
UNITED STATES PATENTS
3,011,662  12/1961  Daily..........................250/43.5 FL X FOREIGN PATENTS OR APPLICATIONS
249,503  2/1961  Australia........................250/43.5 FL

*Primary Examiner*—Archie R. Borchelt
*Attorney*—C. Henry Peterson, William T. Fryer, III, James J. O'Reilly and Cushman, Darby & Cushman

[57] ABSTRACT

A nucleonic fill gauge for a vessel is provided by mounting a source of radiation inside the vessel to direct radiation in all directions toward the walls of the vessel. A plurality of radiation detectors mounted on the walls around the outside of the vessel respond to radiation passing through the material in the vessel. The signals from each detector are coupled, for example, by light pipe means to a central processor which generates an output signal proportional to the amount of material in the vessel.

13 Claims, 3 Drawing Figures

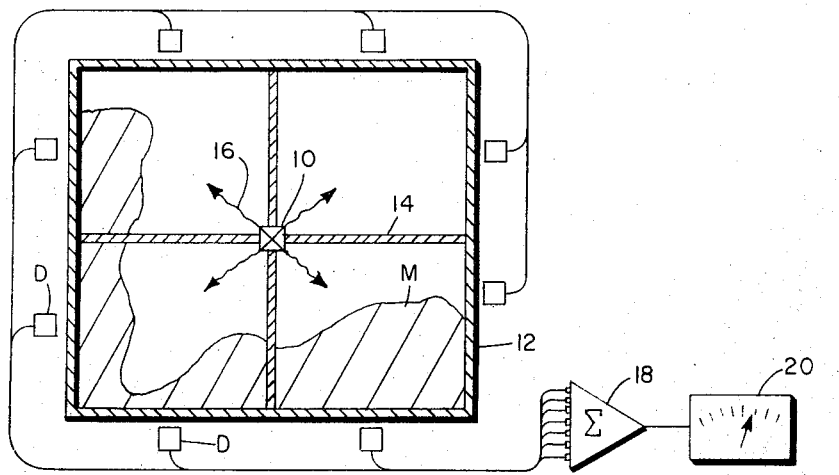
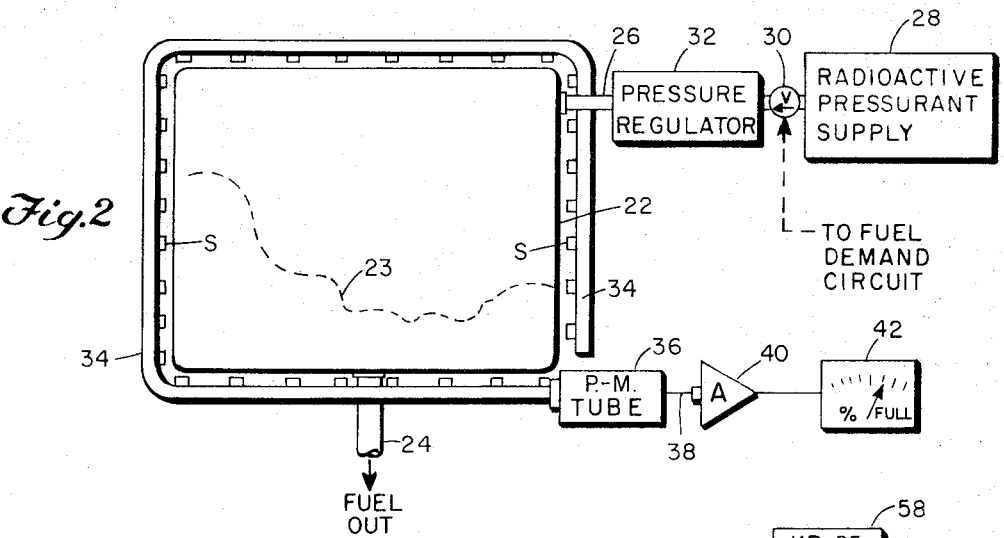
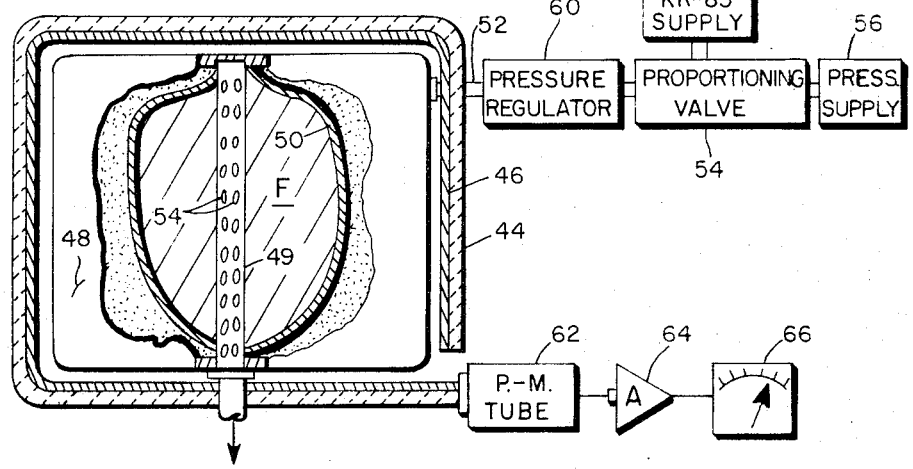
INVENTOR PHILIP T. MARTIN
BY James J. O'Reilly
AGENT

RADIATION FILL GAUGE

This invention relates generally to fill gauges and more specifically to an improved method and means for measuring the total volume of material in a vessel irrespective of its spatial distribution therein.

BACKGROUND INFORMATION

The determination of the amount of material in a vessel has been measured by capacitance gauges, sonar gauges, and radiation gauges. These are usually fill height gauges that measure the extent of a material along one dimension of the vessel. The accuracy of these systems in determining fill volume deteriorates whenever the material's distribution inside the vessel changes due to sloshing or other phenomena resulting from movement of the storage vessel.

For example, along with the development of orbiting and interplanetary space vehicles operating in a zero-g environment has arose the problem of measuring the amount of material contained in on-board vessels such as the propellant in the fuel tanks of the vehicles. In the absence of gravity, the propellant randomly orients itself around the interior of the tank. Since most measuring sensors directly sample the fuel either at a fixed point in the tank or along one dimension like the length of the tank, the fuel may easily be displaced out of range of the sensors and they will indicate an empty tank.

One solution to this problem is described in a co-pending application Ser. No. 390,002, filed Aug. 17, 1964, by William B. Joyce and assigned to the same assignee as the present invention. This system discloses a method for measuring the volume of fuel by measuring the volume of the pressurant or ullage. This application discloses injecting a known amount of gaseous radioactive tracer into the tank to disperse the same throughout the pressurant. A single detector is arranged to continuously measure the curie density of the ullage and this provides a quantitative measurement of the ullage volume. Knowledge of the total tank volume and of the fuel density permits the computation of the total fuel mass.

BRIEF DESCRIPTION

In accordance with one embodiment of the present invention, a source of radiation is positioned inside of a vessel to direct radiation outwardly in all directions toward the walls thereof. To detect the total amount of radiation emitted from the vessel, I provide a plurality of detectors over the surface thereof. More specifically, a single source may be mounted in the center of the vessel or a quantity of radioactive material may be mixed with the pressurant. The outputs of the detectors are electrically combined. Alternatively, the light output pulses of a plurality of scintillator crystals are collected by light pipes and coupled to a photomultiplier tube or other device for generating an electrical signal proportional to the total volume of material in said vessel.

OBJECTS

Accordingly, it is a primary object of the present invention to provide a volumetric gauging system that is insensitive to random spatial distributions of the material.

It is another object of the present invention to provide a material volumetric gauging system that may be simply fabricated of existing materials.

It is also an object of the present invention to provide a material volumetric gauging system that is less costly to construct and maintain than similar systems used heretofore.

It is yet another object of the present invention to provide a volumetric gauging system that may be easily adjusted and calibrated.

FIGURE DESCRIPTION

These and numerous other advantages of the present invention will become more apparent upon reference to the following description when taken in conjunction with the appended drawings, in which:

FIG. 1 is a cross-sectional view of a vessel illustrating one embodiment of the fill measuring system of the present invention;

FIG. 2 is a side view, partly diagrammatic of one embodiment of an improved fill measuring system using a radioactive pressurant; and FIG. 3 is a side view, partly in section, of an alternative embodiment of the present invention.

GENERAL DESCRIPTION

To determine the amount of stored material in a vessel, I place a source of nuclear energy inside of the vessel and allow the radiations from the source to radiate through substantially $4\pi$ steradians and interact with all the material in the vessel. By surrounding the vessel with radiation detectors and combining the outputs of each of the detectors, I derive a signal proportional to the amount of material stored inside the vessel irrespective of how it may distribute itself within the vessel. To obtain a representative measurement, the interior source radiates in all directions toward the outside of the vessel and the detectors should intercept as much radiation emitted from the vessel as possible.

There are two different source-detector configurations that I have found to provide the best results. These are hereinafter referred to as the single-source and the dispersed-source embodiments.

CONSTRUCTION OF THE SINGLE-SOURCE EMBODIMENT

With reference now to FIG. 1, a source of radiation 10 is fixedly positioned substantially in the center of a vessel 12 partially filled with stored material M. The source 10 is held in position by four spiders 14 or other suitable mounting. Source 10 emits radiation 16 that travels in all directions with equal intensity toward the walls of the vessel 12. Beta, or gamma, or other radiation may be selected depending on the size of the vessel being measured.

The radiation field around the outside of the vessel varies in strength depending on how much material M is interposed between the source 10 and the wall of the vessel 12. The attenuation of radiation, whether it be beta or gamma, is a function of the density and the "thickness" of the material being measured. A plurality of detectors D surround the vessel 12 to measure the radiation field. Each detector D responds to a cone of radiation defined by the detector with the source 10.

The signal from each detector will be a function of the amount of material included within this detector field of view. It can be seen that while an infinite number of detectors are required to completely sample the material M, a reasonable degree of accuracy can be provided with a limited number of detectors judiciously placed. Computer analysis may be required to determine the optimum number and the physical placement of the detectors for a specified degree of accuracy. Weighting factors may also be required since the detectors D are not all equally spaced from the source 10.

The output signals of each detector can be combined in a summing amplifier 18. Meter 20 serves to register the amount of material M in the vessel 12. It is appreciated that the detectors D could be ion chambers, G-M tubes or even semiconductor devices for generating an electrical signal in response to radiation. While only a single cross-section of the vessel is shown, the vessel may extend for several feet in which case it is desirable to duplicate the apparatus of FIG. 1 at several cross-sections. The amplifier 18 and indicator 20 may, of course, be common to all cross-section detector groups.

With this technique, the detector outputs increase as the vessel fill drops. If the material M fills the vessel 12 much of the radiation 16 is absorbed. For this reason, the strength of source 10 should be selected to provide a usable detector response under "full" conditions. The measuring sensitivity will increase as the tank empties.

CONSTRUCTION OF THE DISPERSED SOURCE EMBODIMENT

Instead of physically mounting a single source of radiation inside the vessel, one may inject a radioactive material or mixture into the tank as the pressurant is introduced, in constant weight ratio with the radioactive material, to fill the empty or ullage space not occupied by the stored material. By keeping the concentration or amount of radioactive material proportional to the amount of ullage constant, a $4\pi$ detector around the vessel will integrate the radiation field emitted by the ullage and provide a signal proportional to its volume. For example, as the ullage volume increases, the amount of radioactive material in the ullage increases, increasing the total radiation received by the $4\pi$ detector. Fill volume or amount of stored material is determined by calibrating the signal using known store material quantities, or by subtracting the measured ullage volume from the total vessel volume which is known or readily determinable. Since the radiation does not have to penetrate the fill material, a much weaker source of radiation can be employed in this embodiment.

Referring now to FIG. 2, a tank 22 is illustrated storing a quantity of fuel outlined by the dotted line 23. A fuel conduit 24 extends outside of the tank 22 to permit the withdrawal of fuel from the tank 22. The fuel may be expelled by admitting a pressurant gas through an inlet conduit 26. I mix a radioactive material with the pressurant and the batch mixture may be contained in a supply 28 and admitted into the tank 22 by means of a valve 30. The mixture is thereby automatically proportioned to provide a desired weight ratio of pressurant and radioactive material in the ullage. A weight ratio sufficient to give a usable detected signal is desired.

Preferably, a pressure regulator 32 is employed to keep the pressure of the ullage constant as its volume changes. While a change in pressure may affect the penetration range of my radioactive mix, it is, in most cases, a second order effect that can be corrected for in the calibration of the measuring system.

The choice of radioisotope is somewhat arbitrary; I have found it advisable to select one that is in the same physical state as the pressurant to minimize any non-dispersal phenomena such as stratification of the isotope within the mix. Krypton 85 works well with a gaseous pressurant such as neon. Whatever the choice, it should be a substance that will not readily dissolve into the fuel because this will reduce the concentration or desired radioactive weight ratio in the ullage and the total ullage volume cannot be predicted from the total radiation summed by the detectors.

To measure substantially the total radiation emitted by the radioactive ullage, I provide a simulated $4\pi$ detector that includes a plurality of light scintillators S spaced around the tank 22. The scintillators S may be any of the well-known crystalline or liquid substances that emit pulses of light under the influence of a radiation field. Instead of electrically combining the detector output signals, as was performed by the embodiment shown in FIG. 1, I collect and combine the light emanations of each scintillator S by means of a tank-encircling light pipe 34. The light pipe 34 is coupled to a photomultiplier tube 36 which converts the collected light pulses into an electrical signal appearing on line 38. Amplifier 40 may be used to drive an indicator mechanism 42 calibrated in units of percent of full tank.

Before the operation of this embodiment is taken up, it is instructive to note that the number and spacing of the scintillators S may be increased to increase the accuracy of fill measurement. Moreover, several light pipes may be used to approach the desired $4\pi$ detector geometry. The light pipe 34 provides an excellent mounting base for the scintillators S, while at the same time collecting light energy from all areas of the tank's surface.

In FIG. 3, I illustrate a continuous detector comprising a light pipe 44 coated on the inside with a phosphor 46. Alternatively, the light pipe may comprise a scintillatable liquid housed in a plastic conduit having mirrored surfaces to contain the light energy. The light pipe 44 encircles a typical expulsion type fuel tank 48 that houses a central conduit 49 communicating with the exterior of the tank. The conduit 49 is located in the fuel F and a flexible bladder 50 encloses the fuel F. Pressurant is admitted via conduit 52 to act against the outside of the bladder 50 to push the fuel F out through the conduit 49. Holes 54 are provided in the conduit 49 to allow the fuel F to flow outside the tank 44.

Instead of pre-mixing the radioactive isotope with the pressurant, it may be desirable to use a material flow proportioning valve 54 connected between the pressurant volume and the pressurant supply 56. A radioactive tracer such as krypton 85 from a supply 58 is automatically mixed in the pressurant by the valve 54 to a constant weight ratio when more pressurant is added to the tank to expel fuel. In this manner, the weight ratio of tracer to pressurant remains constant even though the pressurant volume changes. The radioactive material concentration of the ullage changes so that an externally integrated field measurement yields a signal proportional to the total pressurant volume. A pressure regulator 60 may be employed to keep the tank pressure constant.

To readout the tank fill volume, a photomultiplier tube 62, amplifier 64, and meter 66 may be used.

In either the discrete scintillator or the continuous phosphor types of $4\pi$ detector, the operation of my invention proceeds as follows: With this type of source probing, a large source is not necessary, since it is not necessary to direct radiation through the material to obtain a signal. The $4\pi$ detector responds to radiation emitted by the free ullage volume; radiation over the entire tank surface is measured. Of course, only those detectors located by areas adjacent to the ullage are excited. Moreover, since the radioactive material concentration of the ullage changes and the pressure therein is maintained constant, the integrated radiation will be proportional to the total volume of ullage present. It can be seen that the detector output will also increase at low fuel levels. This is desirable since it is precisely under these conditions that maximum accuracy and sensitivity are usually required.

SUMMARY

The combination of the interior radiation source and $4\pi$ detector insures that fuel volume is accurately measured regardless of how it may orient itself in the tank. In zero-g space flight, the spatial distribution may be quite random and unpredictable. The preferred light pipe construction enables the immediate integration of ullage field data while at the same time providing a compact simulated $4\pi$ detector.

Accordingly, many changes and modifications can be made in the illustrated embodiments of the present invention, since they are merely examples wherein the utility and advantages of the invention are particularly obvious. Such changes can be made that do not encroach upon the true spirit and scope of the present invention as particularly defined by the appended claims.

I claim:

1. Apparatus for gauging the amount of stored material contained in a vessel, comprising:
   means for mixing a radioactive material in the ullage of said vessel to maintain the concentration of said radioactive material therein substantially constant,
   means for measuring substantially the total radiation emitted by said ullage, and
   means for utilizing said radiation measurement to indicate the total amount of stored material contained in said vessel.

2. Apparatus for gauging the amount of stored material contained in a vessel, comprising:
   means for mixing a radioactive material within the ullage of said vessel to maintain the concentration of said radioactive material therein substantially constant,
   detector means substantially surrounding said vessel to respond to substantially the total amount of radiation emitted by said ullage, and
   circuit means connected to said detector means to generate a first signal proportional to the total volume of said radioactive material in said vessel.

3. Apparatus for gauging the amount of stored material contained in a vessel of known volume, comprising:
   a vessel,
   a radioactive source,
   means for mounting said source inside said vessel to direct radiation outwardly in all directions, and
   detector means positioned outside of said vessel for responding to substantially the total amount of radiation directed outwardly from said vessel for indicating the total amount of stored material contained in said vessel.

4. Apparatus for gauging the amount of material contained in a vessel of known shape, comprising:
   means for continuously mixing a radioactive gas throughout the ullage of said vessel to maintain the concentration of said gas therein substantially constant,
   a plurality of radiation detectors positioned over the surface of said vessel responsive to a substantial amount of the total radiation emitted by said ullage,
   means for combining the output of said detectors to provide a signal representative of the volume of said ullage, and
   means for utilizing said measurement to indicate the amount of material in said vessel.

5. The method of determining the volume of material in a vessel, comprising the steps of:
   continuously mixing a radioactive tracer in the ullage of said vessel to provide a substantially constant tracer concentration therein,
   measuring substantially the total radiation emitted by said ullage,
   generating a signal in response to said total radiation measurement, and
   utilizing said signal to compute the volume of said material in said vessel.

6. The method of determining the volume of a material in a vessel, comprising the steps of:
   introducing a radioactive gas in said vessel mixed with a pressurant,
   maintaining a constant pressure in said ullage irrespective of ullage volume changes, and
   measuring substantially the total radiation emitted from said ullage to obtain an indication of the volume of said material.

7. Volumetric measuring apparatus, comprising: a vessel for storing material including an outlet conduit,
   means for forcing said material out said conduit with an expulsion gas filling the ullage volume of said vessel occupied by said stored material of said vessel,
   means for continuously mixing a radioactive tracer with said expulsion gas to maintain the radioactive tracer concentration in said ullage volume substantially constant,
   radiation detector means surrounding said vessel for measuring the total amount of radioactive tracer in said vessel, and
   means responsive to said total tracer measurement for indicating the volume of material stored in said vessel.

8. Volumetric measuring apparatus, comprising: a vessel for enclosing material whose volume is to be measured, a source of nuclear radiation disposed inside of said vessel to direct radiation outwardly in all directions toward the walls of said vessel, detector means substantially surrounding said vessel for measuring substantially the total amount of radiation passing through said vessel walls, and means utilizing said total radiation measurement for indicating the total volume of said enclosed material.

9. Apparatus, as set forth in claim 8, wherein said nuclear radiation source comprises a radioisotope mounted substantially in the center of said tank, and wherein said detector means comprises a plurality of radiation detectors positioned around the outer surface of vessel walls.

10. Volumetric measuring apparatus, comprising: a vessel for enclosing material to be measured, means for continuously uniformly mixing a radioactive tracer within the ullage of said vessel to maintain the density of said tracer therein substantially constant, detector means including a plurality of scintillating members positioned on all sides of said vessel for generating light pulses in accordance with the amount of radiation impinging thereon, means for conducting said light pulses away from said scintillating members and means for combining said light pulses to provide an output signal proportional to the total amount of radiation integrated over the entire surface of said vessel, and means for utilizing said output signal to indicate the total volume of material enclosed by said vessel.

11. Volumetric measuring apparatus, comprising:
a vessel for enclosing material to be measured,
means for continuously uniformly mixing a gaseous radioisotope within the ullage of said vessel, detector means including a plurality of scintillating phosphors positioned on all sides of said vessel for generating light pulses in accordance with the amount of radiation impinging thereon and light conducting members connecting said scintillating phosphors together to integrate the amount of radiation emitted over the entire surface of said vessel, and means for utilizing said integrated radiation measurement to indicate the total volume of material enclosed by said vessel.

12. Volumetric measuring apparatus, comprising:
a vessel for enclosing material to be measured,
means for continuously uniformly mixing a gaseous radioisotope within the ullage of said vessel, detector means including a plurality of phosphor-coated light pipes extending substantially over the entire surface of said vessel to provide a quantity of light proportional to the total amount of radiation emitted by said ullage and means for converting said light quantity into an electrical signal, and means for utilizing said electrical signal to indicate the total volume of material enclosed by said vessel.

13. Apparatus as in claim 3 wherein said detector means comprises a plurality of detectors mounted around the outside of said vessel each providing a signal proportional to the amount of radiation passing through a different portion of said material, and means for combining said detector signals to provide an output signal representative of the total amount of material in said vessel.

* * * * *